United States Patent [19]

van der Lely et al.

[11] Patent Number: 4,679,384
[45] Date of Patent: Jul. 14, 1987

[54] MOWING MACHINE

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 687,494

[22] Filed: Dec. 31, 1984

Related U.S. Application Data

[63] Continuation of Ser. No. 489,000, Apr. 27, 1983, abandoned.

[51] Int. Cl.⁴ ............................................. A01D 34/44
[52] U.S. Cl. ........................................ 56/13.6; 56/6; 56/12.6
[58] Field of Search .................. 56/6, 12.3, 12.6, 192, 56/295, 320.1, 13.6

[56] References Cited

U.S. PATENT DOCUMENTS

| 3,513,648 | 5/1970 | Kline et al. | 56/13.6 |
| 4,103,476 | 8/1978 | Oosterling et al. | 56/295 |
| 4,157,004 | 6/1979 | van der Lely | 56/13.6 |
| 4,197,692 | 4/1980 | Weber | 56/13.6 |
| 4,201,033 | 5/1980 | Meek et al. | 56/13.6 |
| 4,231,216 | 11/1980 | Weber | 56/6 |
| 4,312,421 | 1/1982 | Pioch | 56/320.1 |
| 4,426,828 | 1/1984 | Neuerburg | 56/13.6 |

FOREIGN PATENT DOCUMENTS

| 13463 | 4/1969 | Australia . | |
| 48301 | 1/1983 | European Pat. Off. | 56/13.6 |
| 3035961 | 4/1961 | Fed. Rep. of Germany . | |
| 2825665 | 1/1979 | Fed. Rep. of Germany . | |
| 2935495 | 3/1980 | Fed. Rep. of Germany . | |
| 7715244 | 5/1977 | France . | |
| 7718776 | 6/1977 | France . | |
| 2068206 | 8/1981 | United Kingdom | 56/13.6 |

Primary Examiner—Robert Peshock
Assistant Examiner—Cary E. Stone
Attorney, Agent, or Firm—Penrose Lucas Albright

[57] ABSTRACT

A mowing machine which has a rotary cutting member rotatably journalled to a shaft received in a drive housing. The drive housing has connected to it a supporting skid extending under and forward thereof for engagement with the ground. The skid defines, with the drive housing, a space which is filled with a lightweight material such as foam. The material prevents foreign matter from getting into the space, strengthens the skid, reduces the connective welding required and alters the weight and other characteristics of the machine. A plurality of like rotary cutting members with supporting skids are mounted side-by-side.

42 Claims, 6 Drawing Figures

U.S. Patent Jul. 14, 1987 Sheet 3 of 3 4,679,384
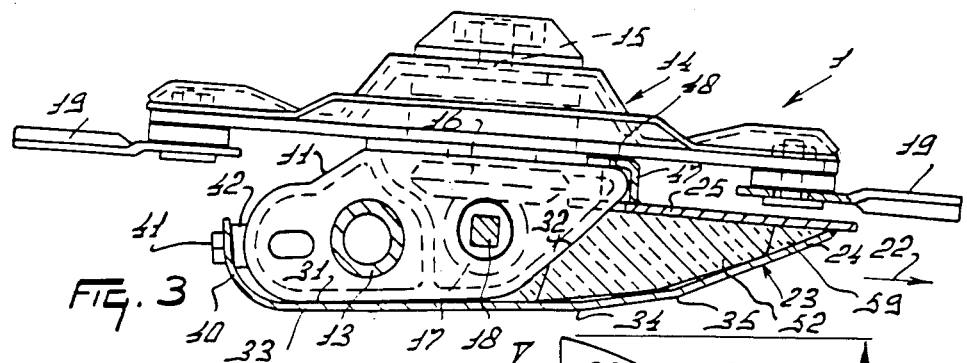

MOWING MACHINE

RELATED APPLICATIONS

This is a continuation of application Ser. No. 489,000 filed Apr. 27, 1983, now abandoned.

BACKGROUND OF THE INVENTION

This invention relates to mowing machines of the type comprising a cutting member and a supporting skid which bears, in use, on the ground to support at least part of the weight of the machine.

SUMMARY OF THE INVENTION

According to the present invention there is provided a mowing machine comprising a cutting member and a supporting skid for bearing on the ground to support at least part of the weight of the machine during operation, the supporting skid at least partly defining a space which is filled at least primarily by a lightweight filling material.

In operation of a mowing machine in accordance with the present invention, the space defined by the supporting skid cannot be undesirably filled with, for example, earth. This might increase the weight of the machine, which would adversely affect the construction of the cutter bar. By filling the space with lightweight material, the manufacture of the machine can be simplified, and also the skid can be more easily mounted on the mowing machine.

An advantageous embodiment can be obtained when the space is defined by a supporting plate on the underside of the supporting skid and side walls extending upwardly from the supporting plate. Preferably, the space is also covered on the top side. The space can be effectively filled when the lightweight filling material is a foam. This foam can be introduced into the space when the skid is mounted on the machine so that the foam can completely fill the space.

An advantageous embodiment is obtained when the supporting skid is constructed as a separate component and is mounted as a unit on the mowing machine. By filling the space after the supporting skid has been mounted, the connection of the skid with the cutter bar can be effectively established.

BRIEF DESCRIPTION OF THE DRAWINGS

FIG. 3 is a sectional view of the supporting skid taken on the line III—III in FIG. 2, whereby parts of the machine are shown in side view;

FIG. 4 is a bottom view of part of the machine taken in the direction of the arrow IV in FIG. 3;

FIG. 5 is a sectional view taken on the line V—V in FIG. 3;

FIG. 6 is an elevational view of the supporting skid taken on the line VI—VI in FIG. 2, whereby parts of the machine are also shown in elevational view.

DETAILED DESCRIPTION OF A PREFERRED EMBODIMENT

Figure 1:
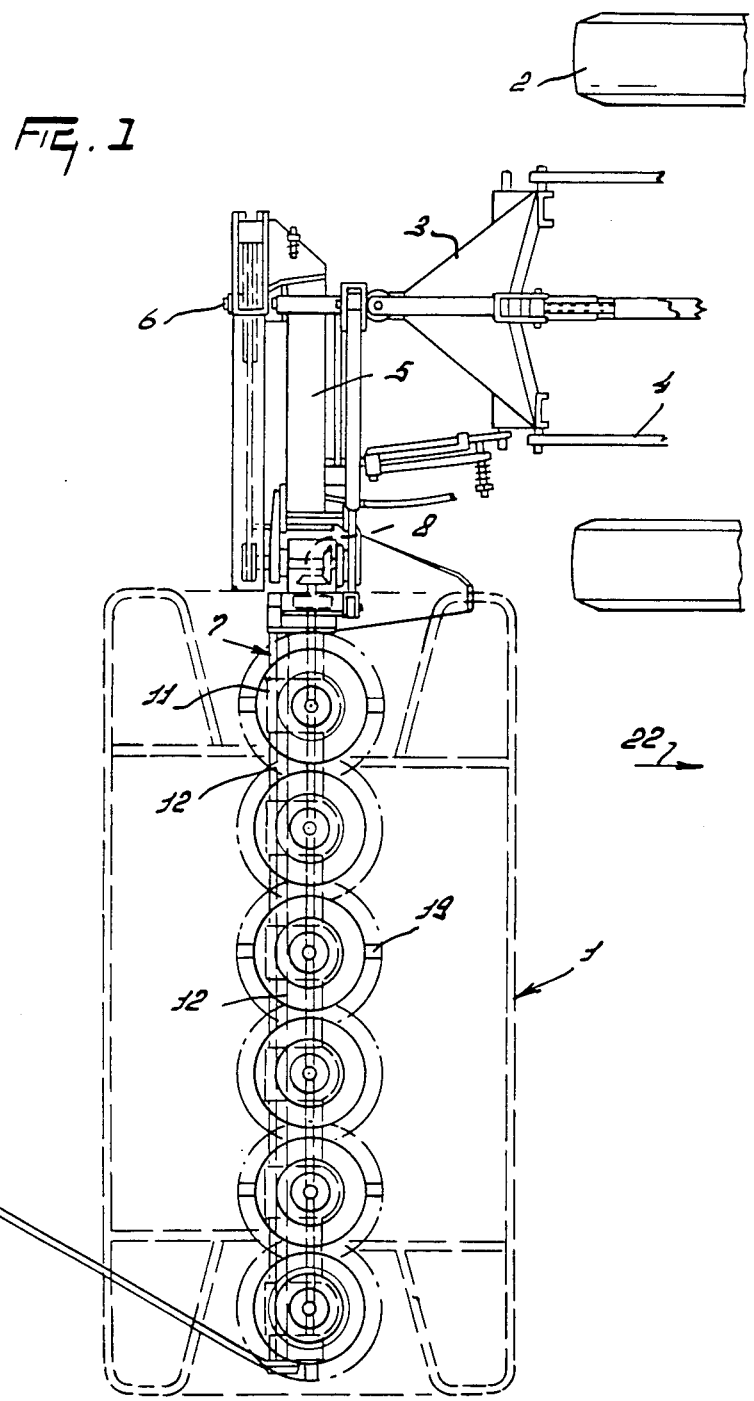
FIG. 1 is a plan view of a mowing machine.
Figure 2:
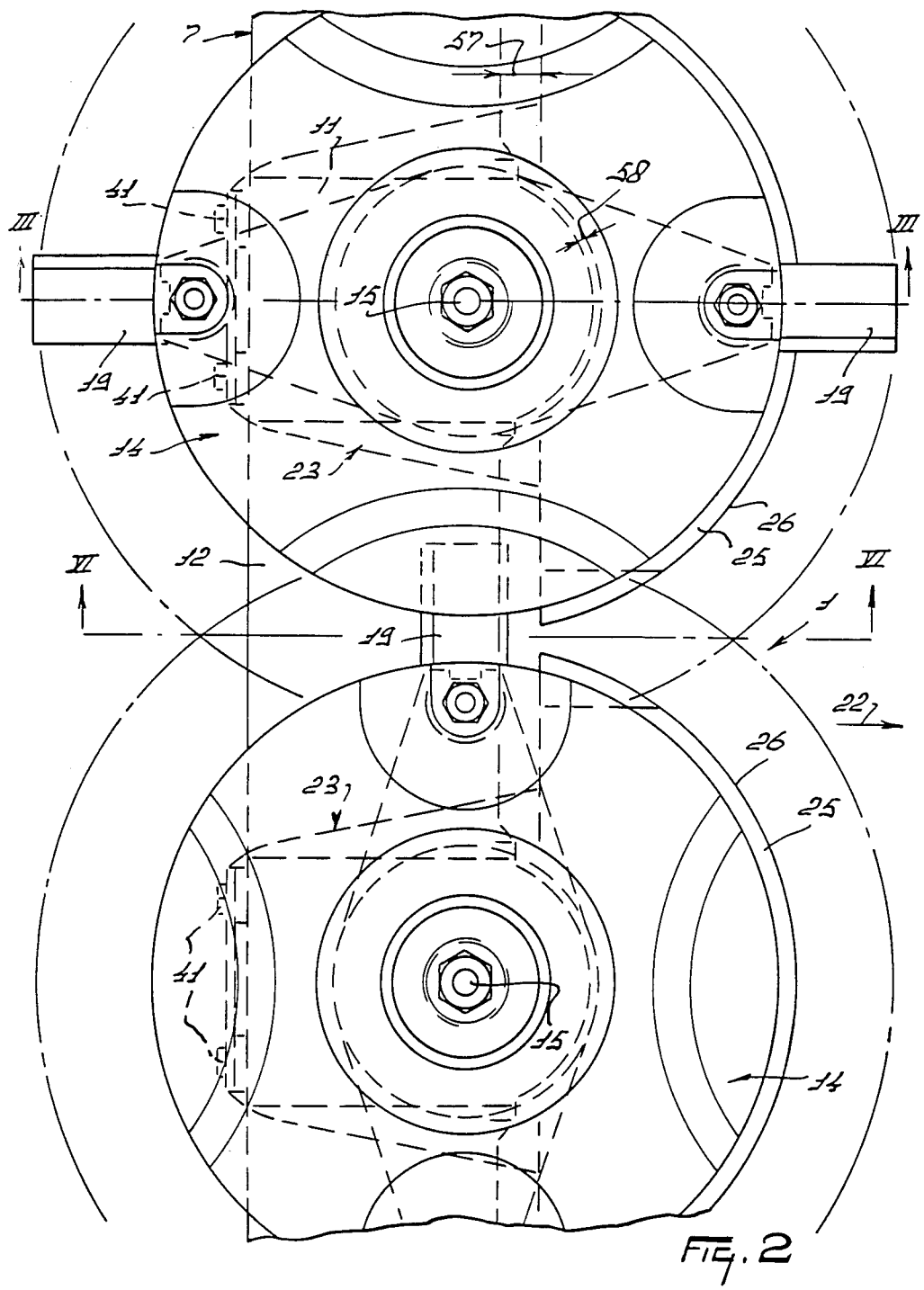
FIG. 2 is an enlarged plan view of part of the machine of FIG. 1.

The mowing machine 1 shown in the Figures comprises a coupling hitch 3 by means of which the machine is attached to a lifting device 4 of a tractor, represented in FIG. 1 only by the lifting device 4 and wheels 2. The mowing machine comprises a carrier arm 5, which is coupled by a substantially horizontal pivotal shaft 6 to the hitch 3. A cutter bar 7 is connected to the carrier arm 5 by a pivotal shaft 8 extending parallel to the pivotal shaft 6.

The cutter bar 7 has a supporting member made up of housings 11 and intermediate pieces 12, which are coupled with one another in a manner not shown in detail by a coupling bar 13 (FIGS. 1 and 3). Each drive housing 11 carries a cutting member 14 which is fastened to a shaft 15 rotatably journalled in the drive housing. The shaft 15 is provided with a gear wheel 16, which cooperates with a gear wheel 17 in the drive housing 11. The gear wheel 17 is fastened to a drive shaft 18, which extends through the drive housings and the intermediate pieces 12 substantially the full length of the cutter bar. The cutting members 14 are provided with cutting blades 19. Each cutting member has two cutting blades which are disposed diametrically opposite one another.

The cutter bar 7 is provided with supporting skids 23 which bear on the ground in operation to support at least part of the weight of the cutter bar. These skids 23 are arranged so that there is one of them beneath each of the drive housings 11 and hence below each cutting member 14. The supporting skids are identical to each other and only one supporting skid is shown in detail in FIGS. 3 to 6.

The supporting skid 23 comprises a supporting plate 24 and a top plate 25. The top plate 25 is a closed, flat plate having an arcuate circumferential edge 26. The edge 26 is concentric with the center line 28 of the shaft 15 which constitutes the rotary axis of the cutting member 14. The edge 26 is at a distance 27 from the rotary axis 28 and constitutes the leading edge of the supporting skid, with respect to the normal direction 22 of operative travel of the mowing machine. The top plate 25 has a rear edge 29, which is substantially parallel to a plane 30 containing the rotary axes 28 of the row of cutting members.

The supporting plate 24 has a flat part 33 which adjoins the underside 31 of the drive housing 11. From the part 33 the supporting plate 24 projects forwardly beyond the front side 32 of the drive housing. From the part 33 the supporting plate slopes upwardly, being bent through small angles at two bends 34 and 35, meeting the underside of the top plate 25 near the leading edge 26. Between the supporting plate 24 and the top plate 25, on both sides of the supporting plate, there are side walls 37, 38 and 39 which constitute connecting parts between the supporting plate and the top plate. The forward part of skid 23 is thus roughly similar to the forward part or bow of a boat wherein top plate 25 is the forward weather deck and supporting plate 24 together with sidewalls 37, 38 and 39 define the forward hull of the boat, internal ridges 43 and 44 constituting structural bulkheads. At the rear, the supporting skid 23 is provided with an upwardly bent rear portion 40, which is fastened by bolts 41 to lugs 42 of the drive housing 11. The top plate 25 and the supporting plate 24 are furthermore coupled to each other by stiffening ridges or connecting pieces 43 and 44, which are at right angles to the top plate 25 and to most of the supporting plate 24. The top face of the top plate 25 is provided with a coupling portion 47, which is curved centrally around the rotary axis 28. The coupling piece 47 engages the leading edge of the drive housing 11, which leading edge is also centered on the rotary axis 28. The coupling portion 47 has an upper flange 48 which extends substantially parallel to the plate 25 and engages the top face of the housing 11 in the manner of a hook in the mounted state of the skid 23 as is shown in FIGS. 3 and 6.

The rear portion 40 of the supporting skid 23 has a width 49 which is approximately equal to the width of the drive housing 11. From the rear, the side edges of the skid, constituted at this region by the supporting plate 24, diverge to the front, with respect to the direction 22. The supporting plate 24 has its largest width 50 at the bend 35, the width 50 being approximately twice the width 49. The top plate 25 has a width 51, which is about twice the radius 27, since the top plate subtends an angle of nearly 180° around the rotary axis 28. However, the rear edge 29 lies at a small distance 55 in front of the plane 30. The plate 25 has, near its rear edge and in the middle, a recessed part with respect to the edge 29, this recessed part being bounded by a peripheral edge 56 concentric with the axis 28 and lying near the coupling portion 47. There is a small clearance 58 between the peripheral edge 56 and the leading edge of the housing 11, the edge 29 being located a short distance 57 from the leading edges of the intermediate pieces 12.

Above the upwardly sloping front portion of the supporting plate 24 and between the upwardly extending side walls 37, 38 and 39 there is a hollow space 52, which is covered at the top by the plate 25. This space, which is substantially wholly enclosed in the illustrated embodiment, is filled with a material 59 of light weight, i.e. of low density.

In use of the machine, it is moved by the tractor in the direction 22, the cutter bar 7 being substantially at right angles to the travel direction. The supporting skids 23 bear on the ground to support at least part of the weight of the cutter bar. The part 33 lies more or less flat on the ground, the mowing discs 14 being slightly inclined downwardly to the front. The upwardly inclined front portion of the supporting plate 24 of the supporting skid 23 provides a satisfactory sliding movement of the supporting skid and hence of the cutter bar along unevennesses of the ground. The front portion of the supporting skid protects the underside of the cutting member from unevennesses formed, for example, by stones. Mainly only the blades 19 will protrude beyond the leading edge 26 of the supporting skid. In order to ensure a satisfactory sliding movement over unevennesses of the ground the lower plate slopes upwards at a small angle from the part 33, while the side walls 37, 38 and 39 at both sides of the plate 24 are provided to deflect obstructions away laterally, for which purpose—as will be particularly apparent from FIG. 5—the side walls 39 diverge from bottom to top.

The hollow space formed above the front portion of the lower plate 24 and between the side walls 37 to 39 is filled by a lightweight filling material. In this way dirt and other foreign matter is prevented from accumulating inside the hollow space. Otherwise, during the travel over the ground, earth could penetrate through the gaps between the various adjoining parts and accumulate in the hollow space 52. The skids, and therefore the cutter bar 7 as a whole, would thus become significantly heavier. This would mean that the construction would have to be stiffened to avoid the risk that the construction might be damaged. In particular, the longer the cutter bar and the more supporting skids and cutting members that are provided, the greater would be the adverse effects of the weight of earth in the space 52. The construction described above avoids these adverse effects. Furthermore, the presence of the lightweight material in the hollow space provides better protection on the inner side against moisture and dirt so that corrosion on this inner side is less likely to occur. A particularly satisfactory possibility of filling the space with lightweight material lies in the introduction of material into the space, which owing to its composition changes into a foam which will completely fill the space. The filling material 59 can satisfactorily adjoin the front 32 of the housing 11 and the intermediate piece 12 when the material 59 is introduced into the space 52 after the supporting skid has been mounted on the housing. The filling material may be introduced into the space between the front of the housing 11 and the intermediate piece 12 and the rear edge 53 of the side face 39 (FIG. 6). Any gaps and openings between the edges 53 and the front of the housing will be satisfactorily closed by the filling material so that no earth or other material can penetrate through them into the hollow space when the machine is in operation.

If necessary, an opening may be provided in the top plate 25 for introducing the filling material. Particularly, for example, for introducing the filling material between the ridges 43 and 44, an opening in the top plate 25 may be advantageous.

By introducing the filling material all gaps between the adjoining parts, for example, at the top edges of the lower plate 24 and the side faces 37 to 39 at the top plate 25 will be effectively closed. It is, therefore, not necessary to weld the plate 24 and the side faces 37 to 39 along the whole adjoining edge to the underside of the plate 25 in order to obtain a closed edge contact. Moreover the side edges 53 and the edges 56 and 29 need not accurately fit the front of the housing 11 and the intermediate piece 12. As a result the supporting skid can be more readily manufactured or mouted or both.

The filling material has the effect of increasing the stiffness of the plate 25 and the supporting plate 24 with the side faces 37 to 39 so that the sheet material from which the skid is made may, if desired, be slightly thinner than would be necessary if the space 52 were left empty.

Although in the illustrated embodiment the space 52 is almost entirely enclosed by the top plate 25 and the lower plate 24 with the side faces 37 to 39, such a space, which is usually formed at the front of a skid, may be more or less open at the top.

Although in the illustrated embodiment a supporting skid of defined form is shown, it will be obvious that differently shaped supporting skids below cutting members or cutter bars of a different construction may be provided with a filling material in those spaces in which earth might otherwise be accumulated, for example, the space of a dish-shaped supporting skid arranged below a cutting member.

Further, whereas various features of the mowing machine described and illustrated are set forth in the following claims as inventive features, the invention is not necessarily limited to these features and many encompasses all other inventive features disclosed both individually and in various combinations.

We claim:

1. A mowing machine comprising:
   a cutting member;
   a supporting member for said cutting member, said supporting member comprising on its lowest side a flat part;

a supporting skid for bearing on the ground to support at least part of the weight of the machine during operation, a rear portion of said supporting skid bearing against said flat part over substantially the latter's entire area for carrying said supporting member, a forward portion of said supporting skid extending forward of said supporting member, said forward portion diverging rearwardly;

a space defined at least in part by the supporting skid between the forward portion of said supporting skid and said supporting member; and a body of lightweight filling material occupying a substantial portion of said space and establishing an effective connection beteweeen said supporting skid and said supporting member.

2. A mowing machine as claimed in claim 1, wherein the space disposed at the front of the skid has an overall width greater than that of said supporting member.

3. A mowing machine as claimed in claim 1, wherein said rear portion of said supporting skid comprises:

a supporting plate which is in a substantially continuous abutting relationship with said flat part of the underside of the supporting skid; and walls adjoining and extending from said supporting palte on its sides and in front which are inclined to diverge upwardly therefrom, said walls defining said space.

4. A mowing machine as claimed in claim 3, wherein the supporting plate is composed of metal.

5. A mowing machine as claimed in claim 3, wherein said walls diverging upwardly from the sides of said plate have rear edges which are disposed substantially closely adjacent said supporting member.

6. A mowing machine as claimed in claim 5, wherein there are small clearances between said upwardly extending side walls and each side of said supporting member which are contiguous with said space, these clearances being occupied by said filling material.

7. A mowing machine as claimed in claim 3, wherein said supporting plate is provided with a portion extending upwardly from said rear portion which is adjacent said supporting member by which said supporting skid is fastened to said supporting member by bolt means having a substantially horizontal axis, the arrangement of said bolt means, said supporting skid and said supporting member being such that substantially all forces on said bolt means are directed substantially parallel to said horizontal axis.

8. A mowing machine as claimed in claim 7, wherein said bolt means and coupling means spaced above said supporting plate retain said flat part in substantially continuous contact with the rear portion of said supporting skid, said coupling means disposed over said filling material.

9. A mowing machine as claimed in claim 3, wherein said cutting member comprises rotating cutting blades and said space is completely covered on its top side and extends under at least the inboard ends of said cutter blades.

10. A mowing machine as claimed in claim 9, wherein said space is covered at its uppermost aspect by a substantially flat top plate and said space under said top plate is substantially enclosed.

11. A mowing machine as claimed in claim 1, wherein the lightweight filing material is hardened plastic foam.

12. A mowing machine as claimed in claim 11, wherein the filling material is introduced into the space as a liquiform material when the skid has been mounted after which the material changes into hardened plastic foam material which substantially entirely fills said space.

13. A mowing machine as claimed in claim 1, wherein said supporting skid is disposed below the cutting member, the filled space being disposed below the leading portion of said cutting member, with respect to the normal direction of operative travel of the machine.

14. A mowing machine as claimed in claim 1, wherein the supporting skid is a readily removable component which is mounted as a unit on the mowing machine.

15. a mowing machine comprising:

a cutting member;

a supporting member for said cutting member, said supporting member comprising alternating housings and intermediate pieces, and a coupling bar coupling said housings and said intermediate pieces together;

a supporting skid for at least one of said housings for bearing on the ground to support at least part of the weight of the machine during operation, said supporting skid comprising:

a top plate at the top of the forward portion of said supporting skid;

a supporting plate on the underside of said supporting skid;

side walls adjoining said supporting plate and extending upwardly therefrom to said top plate, said top plate, said supporting plate, said one housing and said side walls defining a space; said supporting skid further comprising a body of hardened plastic foam occupying substantially all of said space and establishing a connection between said plates, said side walls and said one housing.

16. A mowing machine as claimed in claim 15, wherein said supporting plate adjoins the underside of said top plate near the leading edge of said top plate and said space is substantially wider than said one housing.

17. A mowing machine as claimed in claim 15, wherein the edges of said supporting plate are welded at least in part to the underside of the said top plate.

18. A mowing machine as claimed in claim 15, wherein at least one connecting piece extends forwardly between and rigidly couples said top plate and said supporting plate.

19. A mowing machine as claimed in claim 15, wherein the rear edge of said supporting plate is curved upwardly and is connected to the rear of said one housing by a horizontally disposed bolt.

20. A mowing machine as claimed in claim 19, wherein there are small lateral clearances between said skid and said one housing which are contiguous with said space, these clearances being occupied by said hardened plastic foam.

21. A mowing machine as claimed in claim 15, wherein the leading edge of said supporting skid has a forward uninterrupted curve as seen in plan, said top plate and the underlying said supporting plate both having a width greater than that of said one housing.

22. A mowing machine as claimed in claim 15, further comprising a hook-like part which is adapted to be hooked around and over a leading part of said one housing to retain said supporting skid in position with respect to said one housing , said leading part and said hook-like part having corresponding curves as seen in plan so that relative transverse movement between said hook-like part and said one housing is prevented.

23. A supporting skid for use in a mowing machine having horizontal cutting revolving blades, the supporting skid comprising:
   an outer component,
   a substantially entirely enclosed space defined in substantial part by the outer component, both said outer component and said enclosed space being generally "D" shaped as seen in plan, the curved portion of said "D" of said outer component adapted to be spaced under said revolving blades and to extend generally parallel to the circumference described by said revolving blades; and
   a body of lightweight filling material occupying substantially all of said space to prevent the accumulation of foreign matter in said space and to protect the inner surfaces defining said space against moisture and dirt.

24. A supporting skid as claimed in claim 23 wherein said space is entirely filled with said lightweight filling material.

25. A supporting skid as claimed in claim 24 wherein said lightweight filling material is a hardened plastic foam material.

26. A supporting skid as claimed in claim 25 which is combined with and connected on the forward side of a drive housing for the mowing machine, said hardened plastic foam material establishing a connection between the skid and said drive housing.

27. A supporting skid as claimed in claim 26 which is combined with a rotary cutter comprising said blades mounted on said drive housing.

28. A supporting skid as claimed in claim 27 wherein there are a plurality of like supporting skids connected thereto in a side-by-side relationship, each said supporting skid being similarly combined with a drive housing which mounts a rotary cutter.

29. A supporting skid as claimed in claim 28 wherein said cutting blades circumscribe a path which extends forward of its corresponding supporting skid and to the rear of its corresponding drive housing.

30. A supporting skid as claimed in claim 29 wherein each said cutting blade is mounted on a circular cutting member which is fastened to a shaft rotatably journalled in the corresponding drive housing.

31. A mowing machine comprising:
   a cutting member;
   a supporting member for said cutting member, said supporting member having a substantially flat underside;
   a supporting skid for bearing on the ground to support at least part of the weight of the machine during operation, said supporting skid comprising;
   a top plate which is at the top of the forward portion of said supporting skid;
   a supporting plate which is on the underside of said supporting skid and which is continuously in abutting contact with said underside of said supporting member substantially along the latter's entire length; and
   side walls adjoining said supporting plate and extending upwardly therefrom to adjoin the underside of said top plate near the leading edge of said top plate, said side walls having rear edges which are disposed substantially closely adjacent said supporting member so that the forward portion of said supporting skid is substantially enclosed on all sides, the rear side of said top plate having means adapted to overlie a leading part of said supporting member to retain said supporting skid in position with respect to said supporting member, the rear edge of said supporting plate being curved upwardly and connected to the rear of said supporting member.

32. A mowing machine as claimed in claim 31, wherein the leading edge of said top plate is curved and the rear edge thereof is adjoining said supporting member, said rear edge having a width greater than that part of said supporting plate underlying said supporting member, said side walls diverging upwardly to said curved leading edge of the top plate.

33. A mowing machine as claimed in claim 31 wherein said supporting member comprises at least one housing and at least one intermediate piece, and a coupling bar extending through successively said supporting member and said intermediate piece coupling them together.

34. A mowing machine as claimed in claim 33 wherein said supporting skid's supporting plate which adjoins said flat underside is at least about as wide as said one housing.

35. A mowing machine as claimed in claim 34 wherein the width of said supporting plate becomes wider as it extends forwardly to become substantially wider than said one housing.

36. A mowing machine as claimed in claim 33 wherein said forward portion of supporting skid is substantially wider than the greatest width of said one housing.

37. A mowing machine comprising:
   a drive housing;
   a rotating cutter member supported by and driven from said drive housing;
   said cutting member comprising an outwardly extending cutting blade which rotates in a circular path; and
   a supporting skid mounted on said drive housing which is connected to the rear of said drive housing and extends therefrom under and forward of said drive housing, said supporting skid comprising an enclosure which extends forward to proximate to and immediately under said circular path, said enclosure comprised and defined by a top plate, a supporting plate connected on its forward aspect to said top plate and diverging downwardly and to the rear therefrom, side walls between said top plate and said supporting plate, and the forward part of said drive housing.

38. A mowing machine in accordance with claim 37 wherein said enclosure is filled with a body of lightweight foam material introduced into said enclosure after said supporting skid is mounted onto said drive housing and substantially completely filling said enclosure so that dirt and other material cannot penetrate into said enclosure when the machine is in operation.

39. A mowing machine in accordance with claim 38 wherein a vertical ridge plate connects said top plate and said supporting plate between said side walls, said ridge plate being adjoined by said foam material.

40. A mowing machine in accordance with claim 37 wherein said side walls are tapered downwardly and inboard relative to said top plate.

41. A mowing machine in accordance with claim 37 wherein said supporting skid forward of said housing consists essentially of said enclosure.

42. A mowing machine in accordance wtih claim 37 wherein said supporting plate diverges to the rear under said drive housing.

* * * * *